Nov. 24, 1931. G. O. JOYNER 1,833,838
SPRING MOTOR
Filed May 31, 1930 4 Sheets-Sheet 4

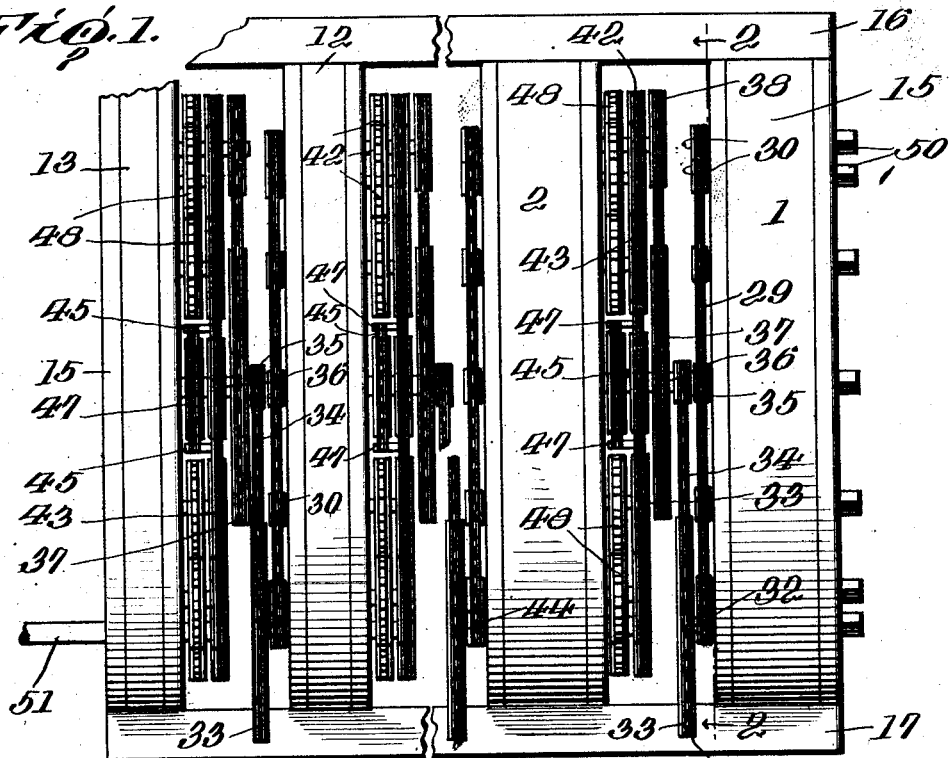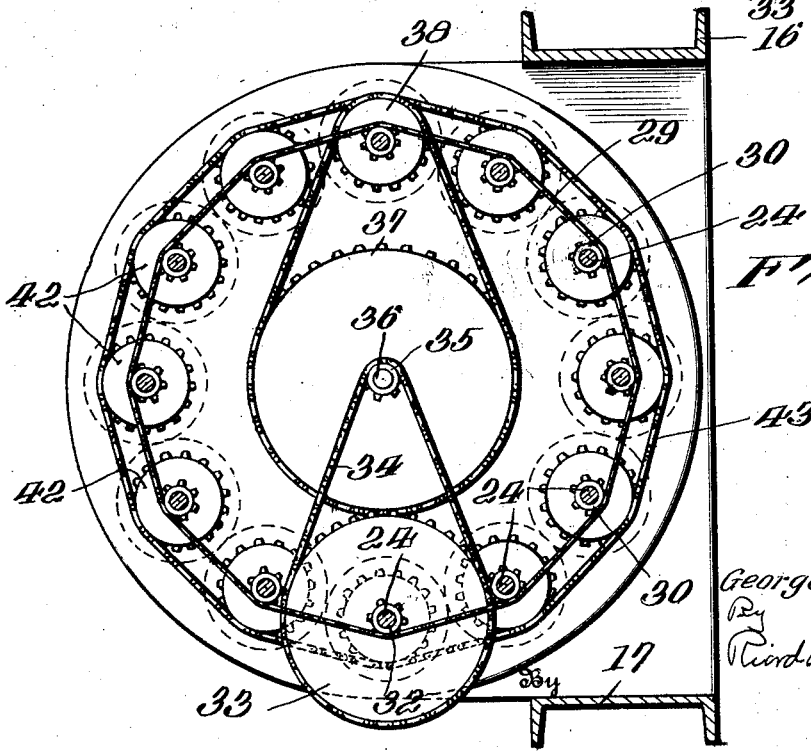

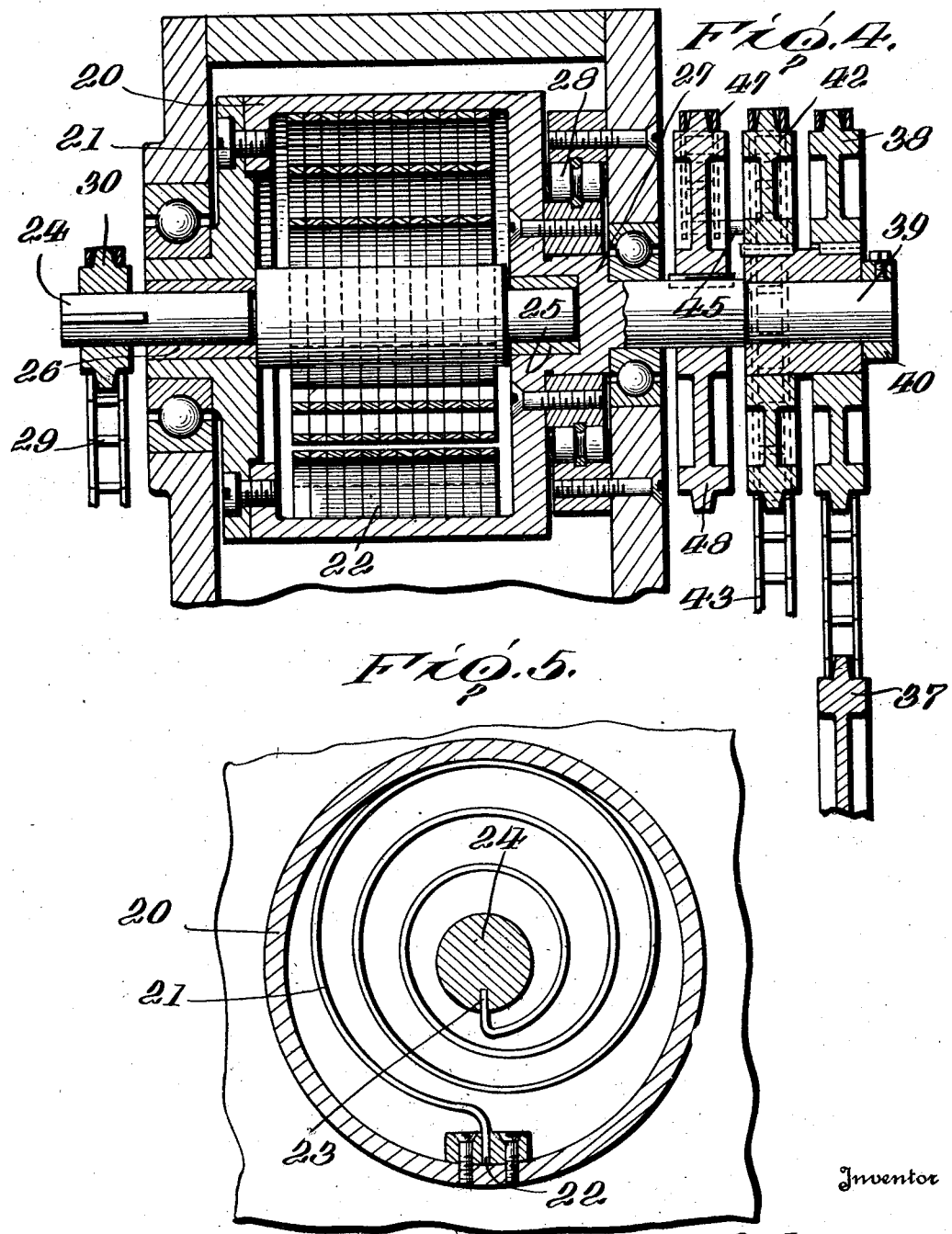

George O. Joyner, Inventor

Patented Nov. 24, 1931

1,833,838

UNITED STATES PATENT OFFICE

GEORGE O. JOYNER, OF ST. LOUIS, MISSOURI

SPRING MOTOR

Application filed May 31, 1930. Serial No. 458,675.

This invention relates to spring motors, an object being to provide a motor which is dependent for its operation upon a series of spring units harnessed in such a manner that all contribute to furnish power to an ultimate take-off.

Another object is to provide a plurality of units interconnected for simultaneous operation, and effective to store energy which is subsequently taken off from one end of the motor. Means are provided to replace energy as it is used, at one end of the motor.

Still another object is to provide in a series of connected units a means to store energy in all units and to utilize one of the units as a governor controlling the output of the entire motor and holding back the stored energy to produce a moderate continuous flow at a rate considerably less in power, but greater in speed than the total possible output of the entire motor.

A further object is the provision of a plurality of springs which are utilized to store up power for the operation of a power shaft, means being provided to replenish the stored up power, when and as it is given off to the shaft.

The operation of the spring motor itself of course, is not dependent upon consumption of fuel, for the stored up energy of the springs will act to provide and permit the continued operation of the motor, means being provided to wind up certain of the springs during operation thereof in transmitting power to the line shaft.

The motor described herein, being capable of storing a large amount of energy and being governed to release it at a predetermined rate, is effective for operations over a long period of time, the time unit being in direct proportion to the flow of energy from the motor.

Other and further objects will appear as the description proceeds, the invention being illustrated in the accompanying drawings, and hereinafter fully described, the novel features being particularly pointed out in the appended claims.

In the drawings

Fig. 1 is a fragmentary elevation of the motor;

Fig. 2 is a section along the line 2—2 of Fig. 1;

Fig. 4 is an enlarged detail section of one spring housing showing driving connections therefor;

Fig. 5 is a detail section through one spring housing;

Figure 3:
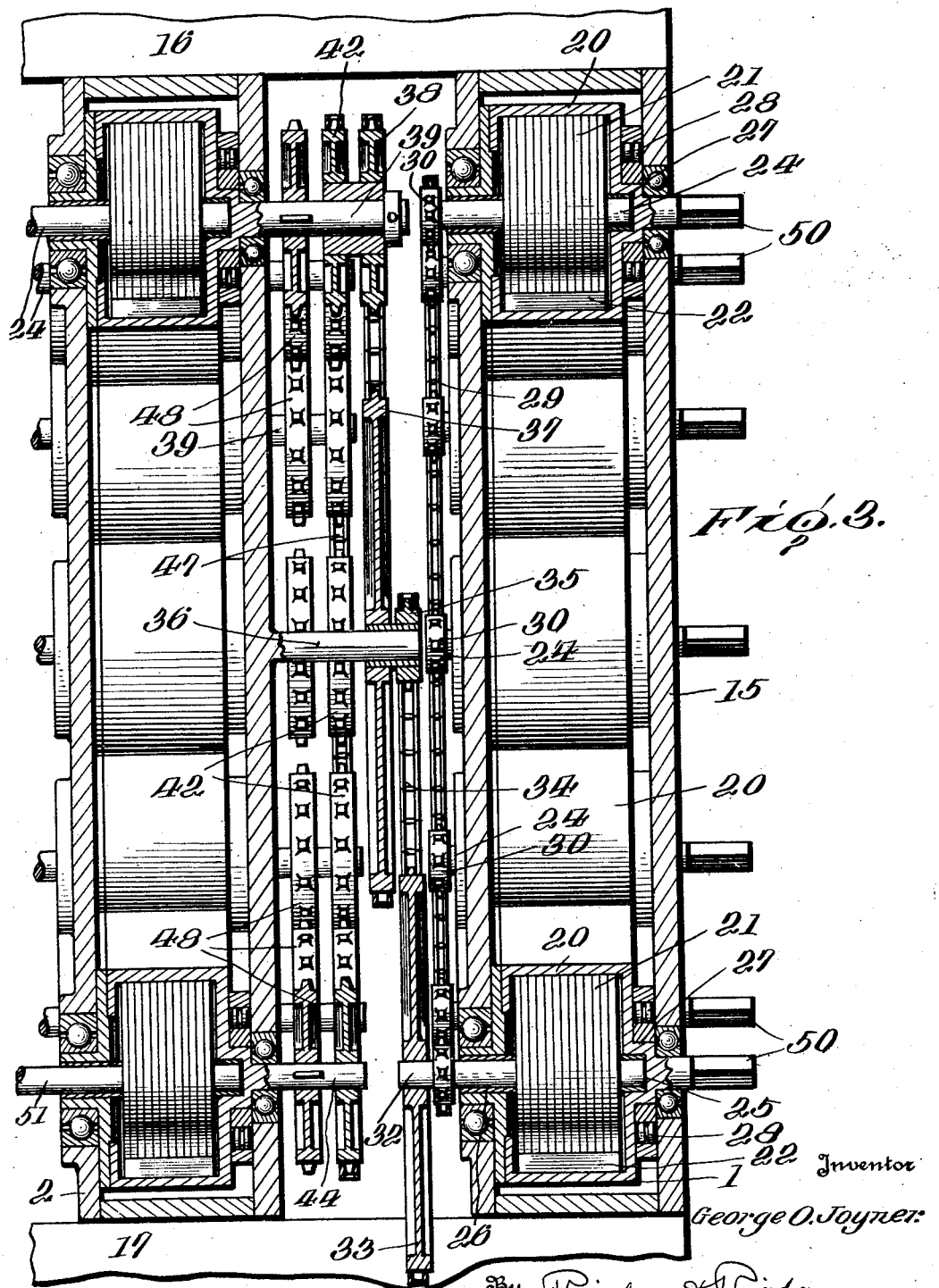
Fig. 3 is an enlarged detail section partially in elevation of the two right hand motor units shown in Fig. 1.

The motor described herein is constituted of units, any desired number of which may be used. These units represent a slightly improved form of construction of the type disclosed in my co-pending applications, Serial No. 298,781, filed August 9th, 1927, and Serial No. 327,320, filed December 20th, 1928.

A preferred embodiment will have thirteen units, Fig. 1 illustrating two units at each end of the motor, the intermediate units being omitted. Each unit is substantially a duplicate of the remaining units, differing only in actual size and strength. These units may be considered in order from 1 to 13, reading right to left in Fig. 1, unit 13 being what is known as a high rotating unit. The units are so harnessed that the thirteenth unit functions as the governor for the remaining twelve, as power derived from the thirteen units is taken off from the thirteenth unit, the twelve preceding units being for the purpose of storing energy. These twelve units continue the effective working life of the high rotating unit, it being obvious that by taking energy away from twelve units the life or working time of the thirteenth unit is shortened, or by adding units to the group of twelve, the life or working time of the thirteenth unit is lengthened.

Each unit is provided with a frame housing 15, the several units being joined as by top bracing members 16 and by base members 17.

Giving consideration, first to unit 1, it will be seen that this unit is provided with twelve spring housings or drums 20, of a desired practical size, it being understood that the invention is not to be limited by specific sizes and dimensions. These spring housings or drums in unit 1 will contain thirteen springs 21, each of suitable size, and preferably long enough to make six turns, as shown in Fig. 5. One end of each spring will be fastened to the drum at 22 and the other end made fast at 23 to a shaft 24 operating in the drum 20.

One end of the shaft will rest in a bearing 25 in the drum and the other end of the shaft will rest at 26 in the frame housing of the unit. Each of the twelve drums 20 is cushioned in a bearing at 27 in the frame housing and is provided adjacent thereto with an overrunning clutch 28 to prevent retrograde movement after the spring therein has been wound, the tendency of the spring being to pull from its point of attachment in the drum. The spring being wound from its end 22, it will be seen that the shaft 24 is free to rotate, giving off power while the spring is being wound.

Twelve shafts 24 will be rotating simultaneously being geared together by a tie chain 29, which meshes with a series of sprockets 30, of which one is provided on an extension of each line shaft 24 (see Fig. 2). The effect of this arrangement is to produce a volume of power equal to the sum of the springs in the twelve spring housings 20.

Each of the units beyond unit 1 will be similarly constructed, differing only by the fact that the number of springs in the drums of each successive unit is reduced by one so that the unit 2 will have twelve drums 20 with twelve springs in each housing, and so on until unit 13 will have twelve drums with but a single spring in each.

In transmitting power from one unit to the next an effective speed differential of three to one ratio is illustrated as desirable. To obtain this differential, a six to one gearing is used between units for the reason that the twelve spring units in unit 2 will be wound one at a time, while all are giving up their power. This will be clear from a consideration of the gearing arrangement between the adjacent units in which the several sprockets, gears and chains are properly proportioned and arranged to provide the desired ratios. See particularly the gearing between units 1 and 2 in Figs. 1, 2 and 3.

The accumulated power of unit 1 will be transmitted to a power take-off or stub shaft 32 which is formed as a continuation of one of the shafts 24. Keyed to this shaft is a sprocket gear 33 connected by a chain 34 to a smaller sprocket 35 freely rotatable on a stub shaft 36. Mounted on shaft 36 for movement with the sprocket 35 is a larger sprocket 37 geared in turn to another and smaller sprocket 38. One of the spring drums is provided with an integral extension 39 in alignment with its respective line shaft 24, to mount a gear 38 which is freely revoluble thereon and prevented from longitudinal movement by a collar and set screw 40.

This projection 39 will extend far enough beyond the frame 15 to support three sprocket gears thereon, the first sprocket being gear 38. Keyed to the gear 38 and freely revoluble therewith is a second gear 42 of like size, which drives a suitable gearing medium such as a chain 43. Each of the remaining drums in the unit has an extension 44 similar to the extension 39 but mounting two gears instead of three. The outer of the two gears will be a duplicate of the gear 42 and is freely revoluble on its respective shaft. Carried by the chain 43 is a projecting member referred to hereinafter as a gear fragment 45, this member, in the present illustration being in the form of a section of sprocket chain supported between spaced pins 47 carried by the chain 43. These pins will support the fragmentary chain 45 in spaced relation from the chain 43 and between the latter chain and the frame housing of unit 2.

Keyed to each of the extensions 39 and located in the path of the gear fragment 45 is a gear 48. As the chain 43 rotates, this gear fragment 45 will mesh in turn with each of the gears 48 to rotate same, eleven of the gears 48 remaining idle while the twelfth is being turned to produce a winding moment on the springs 22 within the housing. This is due to the fact that the housing 20 is integral with the shaft 44 and fast at 22 to the outer end of the spring, and the springs 21 will be wound. The clutch 28 on each drum will prevent retrograde action thereof, and the spring will thus tend to expend its energy, on to the succeeding sprocket chain 29, which in turn transmits power to unit 3.

The gear fragment or chain 45 is so proportioned relative to the gears 48 that each gear 48 with its respective drum will be turned one complete revolution for each complete rotation of the chain 43.

In transmitting power from unit 1 to unit 2, the power of twelve units is used to produce one turn on one of the twelve spring units in unit 2.

The remaining units are repetitions of units 1 and 2 with exception that the number of springs in the spring drums is one less for each drum of succeeding units than those of the unit preceding, as has been stated, and the gearing in between any two units is a repetition of that just described for the transmission of power from unit 1 to unit 2.

Figure 6:
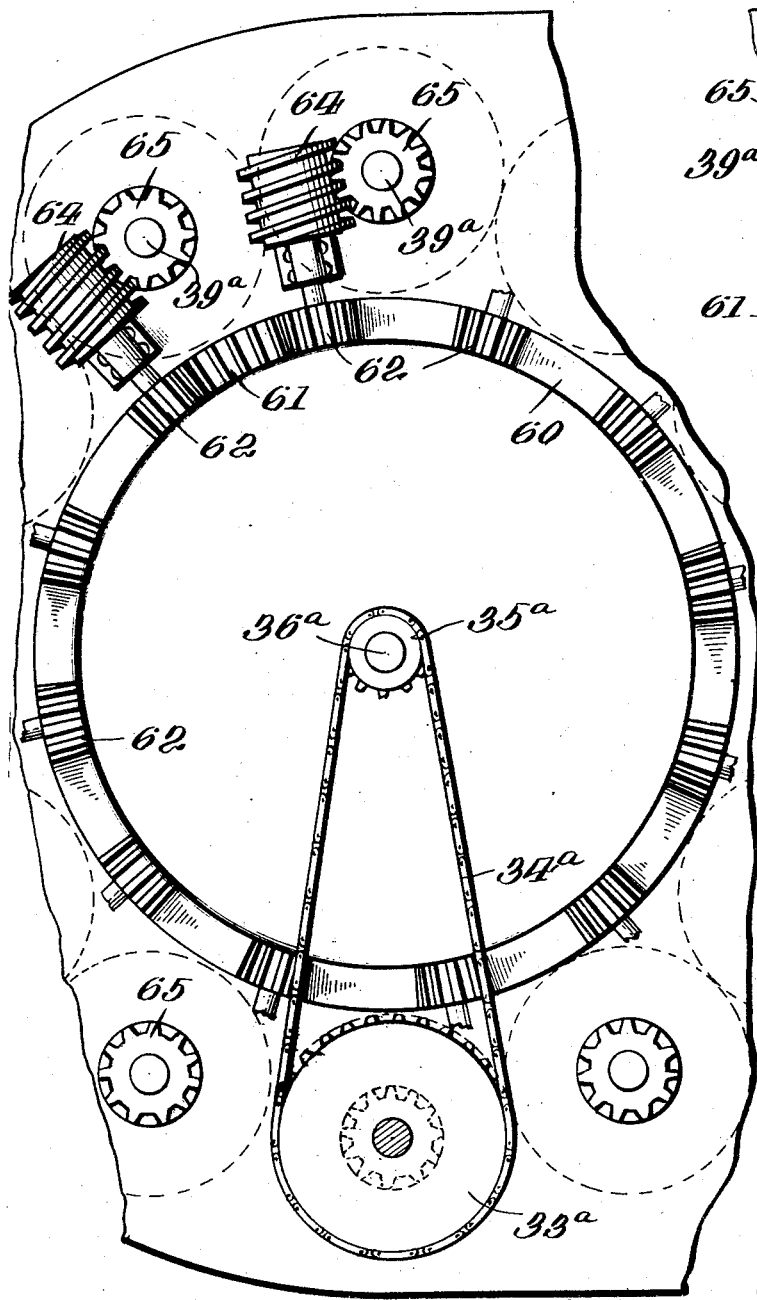
Fig. 6 is a fragmentary elevation of a modified gearing arrangement from that shown in Fig. 2.
Figure 7:
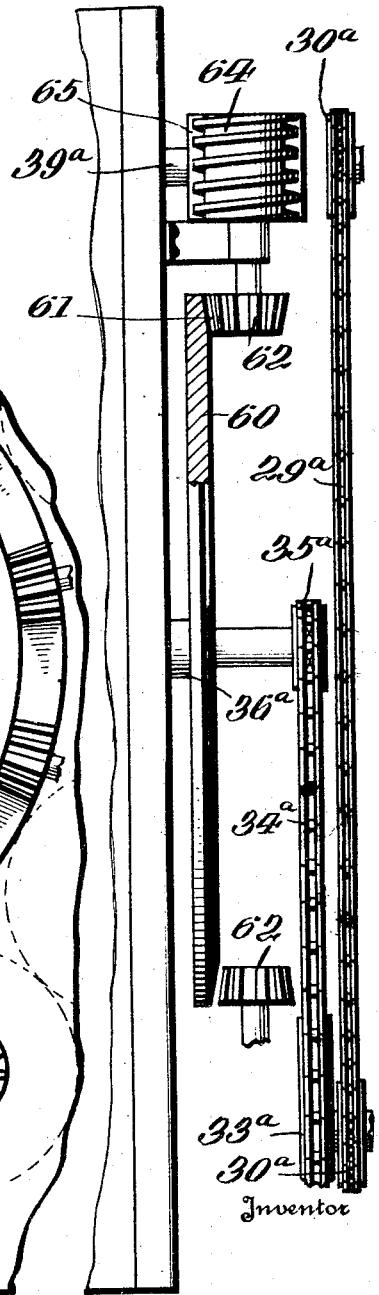
Fig. 7 is a side elevation of the gearing arrangement shown in Fig. 6.

It will be obvious that variations in the gearing between the several units are possible without in any manner affecting the resultant working energy obtained; and in Figs. 6 and 7, one modified form of gearing is shown in which the tie chain 29a encompasses a series of sprockets 30a. These sprockets 30a through the tie chain drive a gear 33a which in turn is connected by gearing 34a to drive a small sprocket 35a. The parts thus far described correspond to the similar elements of the preferred form of invention described above. Sprocket 35a is keyed to a shaft which is freely rotatable in a projection or housing 36a on the frame housing of the unit to be wound. Also keyed on this shaft is a bevel gear 60. This gear 60 is mutilated to provide sections of teeth 61 at spaced intervals about its circumference and corresponds in function to the chain 43 and the gear fragment 45, above described. Each spring housing in the unit to be wound is provided with an extension 39a having a gear 65 keyed to its outer end so that movement of the gear 65 will give a corresponding movement or rotation of its spring housing. Adjacent each gear 65 and in mesh therewith is a worm 64 having a projecting stub extending therefrom. A beveled gear 62 is mounted on the end of each worm stub. It will be obvious then that rotation of the bevel gear 60 will effect an intermittent or periodic rotation of the spring housings to wind the springs therein in a manner very similar to that described with respect to Figs. 1 to 5.

It should be noted that when a worm drive of this nature is used that the sizes of the sprockets and gears are suitably proportioned and will be of a different size from those used in a complete chain gearing, as described with reference to Figs. 1 to 5.

Unit 1, is in the nature of a master unit and as stated above, can be energized by any desired manner of winding. When thus energized and geared to the remaining units which are already wound to their normal degree and with each succeeding unit geared to increase the speed at a differential of three to one, it will be seen that the thirteenth unit will be made to travel many times faster than unit 1. Unit 13, being the high rotating unit, furnishes the drive shaft or intermediate source of power for work to be done. Power can be taken off of the shaft 51, which is in all respects similar to the shaft 32.

Obviously, if desired, suitable gearing from the shaft 51 to an idler shaft located at any desired point on the frame housing of unit 13 would provide a different location for the power take-off.

The speed of this unit 13 is controlled by the load pull and the developed H. P.

From the foregoing, it is believed that the operation of the device will be clear.

For the sake of illustration only, it will be assumed that the present motor is based on a structure capable of producing usuable energy to the equivalent of three H. P. To obtain this result, unit 1 will have stored in each of its twelve drums energy equivalent to 3¼ H. P. and the twelve drums will store a total of approximately 39 H. P. Unit 2 then will have slightly less power stored up, namely, 3 H. P. per housing or 36 H. P. for the unit. With a reduction of one quarter H. P. per drum, for succeeding units, it will be seen that the last unit, 13, will have drums each effective to store one-quarter of a H. P., or a total of 3 H. P. for the unit. Figured out, the total of stored energy in the thirteen units is equal to 273 H. P. By keeping this energy stored for release from unit 13 at the rate of 3 H. P., the motor will run for a considerable period of time, and by periodically restoring energy to the motor, through the medium of winding the springs in unit No. 1, a continuous flow of uninterrupted power will be obtained at the expense of the comparatively little effort necessitated to rewind the initial set of springs.

In other words, considering the entire motor as having all springs initially wound, as the springs in unit 13 give off energy, they will receive energy stored up in unit 12 at a proper rate of rewinding due to the gearing therebetween. Unit 12 in turn will receive energy from unit 11 and so on back to unit 1. The springs in unit 1 may be wound as necessary by the application of power to the shaft ends 50, these ends being projections of the spring housings 20 in unit 1 arranged similar to the projections 39 of the remaining units.

No one of the thirteen units really loses energy except unit 1, the remaining twelve units being kept in a normal wound condition by power transmitted from unit 1 and in turn from one unit to another down the line. With the proper proportions, unit 1 will retain sufficient energy in its springs to make six turns. For the first three turns, it will give off equal energy with the remainder of the units, taking approximately sixteen hours to make the three turns. In the present example it is assumed, of course, that the load pull is such as to secure a rate of speed which will require sixteen hours to make the three turns. The remaining three turns, if there is no rewinding of unit 1, will be sufficient to keep unit 2 rewound until such time as the energy in unit 1 is entirely spent. Unit 2 acts in the same manner, retaining the same effective length of spring as unit 1 and acting the same way in giving off its energy for three turns. Still assuming that there is no rewinding of unit 1, after the energy of unit 1 is spent, unit 2 will be left with sufficient energy to operate the remaining units for a while, and the same condition is true for the remaining units. It is to be noted that because the units are operating simultaneously and the output of power is kept at a reasonable figure, such as 3 H. P., that instead of giving off a tremendous amount of power quickly, the motor will function to produce a steady even flow of power at the desired H. P. over a long period of time, or in other words, the total energy of the thirteen units harnessed together will, in the illustration given, last for something over twenty-four hours for one complete winding of the motor. That is, the high rotating unit, No. 13, harnessed to the remaining twelve units, will handle a 3 H. P. load for over twenty-four hours for one winding of unit No. 1. Unit 1, as proportioned in the present illustration requires three turns on each of its twelve spring housings, or a total of thirty-six turns to wind it, thereby to produce a total output of 3 H. P. for twenty-four hours.

An advantage derived from harnessing the several units as above described may be seen from the following example. If 39 H. P. is stored in unit 1, and this unit is rotating at a speed of three turns in sixteen hours then this unit will, by means of the transmission gearing and intermediate units, deliver through unit 13 3 H. P., at 1660 R. P. M. Thus using the pressure of 39 H. P. and holding it for sixteen hours through the harnessed energy of thirteen units which have a stored energy of 273 H. P., will permit the furnishing of 3 H. P. constantly for sixteen hours at a speed of 1660 R. P. M. It has been explained above how the pressure of the 39 H. P. in unit 1 is transmitted to unit 2 and the speed increased three to one in unit 2. By concentrating the pressure of the twelve spring drums of unit 1, one by one upon the drums of unit 2 at a ratio of six to one, the twelve housings of unit 2 are each wound, one turn, three times, while the twelve housings of unit 1 unwind one turn. By this means the pressure of 39 H. P., in unit 1 is used to replace the 3 H. P. pressure, in one drum at a time in each of the twelve drums of unit 2, doing this three times while unit 1 makes one rotation, thus increasing the speed of 36 H. P. in unit 2 three times. In other words, the energy in unit 1 enables unit 2 to give off its energy three times as long as it otherwise would without the cooperation of unit 1.

Similarly, each of the subsequent units is enabled to distribute its energy three times as long as would normally be the case without the cooperation of the units located in advance thereof. Of course, the speed will be built up progressively from unit 1 to unit 13, in order that unit 13 may give off the ultimate three H. P.

Any independent unit can be built with any desired size, speed and H. P., as each unit is capable of independent functioning, but it is believed that three power units is a minimum for satisfactory operation. Each variation in the number of power units will change the cycle, that is, will automatically change the circumference of each pulley, gear and chain in the transmission mechanism, it being understood that proportions, ratios, time periods, etc., are mentioned only by way of example and illustration.

Having thus described my invention, what I claim as new and desire to secure by Letters Patent of the United States, is:—

1. In a spring motor, the combination of a plurality of spring motor units, means to store energy in each of said units, means to harness said units in succession to each other whereby energy from one unit may be transmitted to the next unit, means to release such energy from the motor, said means being effective to govern the rate of release.

2. In a spring motor, the combination of a plurality of spring motor units, means to store energy in each of said units, means to harness said units in succession to each other whereby energy from one unit may be transmitted to the next unit at an increased speed, means to release such energy from the motors, said means being effective to govern the rate of release.

3. In a spring motor, the combination of a plurality of spring motor units, means to store energy in each of said units, means to harness said units in succession to each other whereby energy from one unit may be transmitted to the next unit, means to release such energy from the motor, said means being under control of the load pull and developed power taken off of the motor, and effective to govern the rate of release of such energy.

4. In a spring motor, the combination of a plurality of spring motor units, means to store energy in each of said units, means to harness said units in succession to each other whereby energy from one unit may be transmitted to the next unit at an increased speed, means to release such energy from the motor, said means being under control of the load pull and developed power taken off of the motor, and effective to govern the rate of release of such energy.

5. In a spring motor, the combination of a plurality of self-contained motor units, means to store energy in each of said units, means to harness said units in succession to each other whereby energy from one unit may be transmitted to the next unit, means to transmit the energy from unit to unit at a progressively increasing speed, and a progressively decreasing rate of power, means to release such energy from the motor, said means being effective to govern the rate of release.

6. In a spring motor, the combination of a plurality of units, harnessed in unison and operative successively to transmit energy from one unit to the next, and each unit being effective to store an increased amount of energy over its successor, means to transmit the stored energy from a unit having the greater capacity to its successive unit, thereby to increase the time of operation of the entire motor.

7. In a spring motor, the combination of a plurality of units, harnessed in unison and operative successively to transmit energy from one unit to the next, and each unit being effective to store an increased amount of energy over its successor, means to transmit the stored energy from one unit to its successive unit, thereby to increase the time of operation of the entire motor, the last of said units having means to take off power from the entire motor and governing the units in advance thereof.

8. In a motor, the combination of a plurality of energy storing units, operatively arranged in line, the unit at one end of the motor producing the greatest energy and having means to release same at slowest speed, the unit at the other end producing the least energy and having means to release same at highest speed, said first named unit providing an input of energy for the motor and said last named unit providing an ultimate output of power from the motor.

9. In a motor, the combination with a plurality of energy storing units, operatively arranged in line, the unit at one end of the motor producing the greatest energy and having means to release same at slowest speed, the unit at the other end producing the least energy and having means to release same at highest speed, of means to transmit energy from said first unit to said last unit comprising a multiplying gearing effective to transmit said energy at a governed rate, and with an increase of speed, said first named unit providing an input of energy for the motor and said last named unit providing an output of power from the motor.

10. In a motor of the type described, a frame housing, a spring drum supported therein, a shaft rotatably mounted in said drum, and spring means in said drum connected at one end to said shaft and at the other end to the interior of said drum, and means on said shaft externally of said drum providing a power take off for energy produced by said spring means.

11. In a motor of the type described, a frame housing, a spring drum supported therein, a shaft rotatably mounted in said drum, and spring means in said drum connected at one end to said shaft and at the other end to the interior of said drum, means to rotate said drum in one direction to wind said spring means, means to hold said drum against rotation in the opposite direction whereby energy developed in the spring means will cause a rotation of said shaft, and means on said shaft externally of said drum providing a power take off for energy produced by said spring means.

12. In a motor of the type described, a frame housing, a plurality of spring drums supported therein, a shaft rotatably mounted in each of said drums, and spring means in each of said drums connected at one end to its drum shaft and the other end to the interior of its drum, means on each shaft externally of each of said drums providing a power take off for energy produced by said spring means.

13. In a motor of the type described, a frame housing, a plurality of spring drums supported therein, a shaft rotatably mounted in each of said drums, and spring means in each of said drums connected at one end to its drum shaft and the other end to the interior of its drum, means on each shaft externally of each of said drums providing a power take off for energy produced by said spring means, and means connecting said shafts to an ultimate power take off member, whereby the sum of the power developed by the several units may be utilized.

14. In a motor of the type described, a frame housing, a plurality of spring drums supported therein, a shaft rotatably mounted in each of said drums and spring means in each of said drums connected at one end to its drum shaft and the other end to the interior of its drum, means to rotate each drum in one direction to wind its spring means, means to hold each drum against rotation in the opposite direction whereby energy developed in the spring means will cause a rotation of its shaft, means on each shaft externally of each of said drums providing a power take-off for energy produced by said spring means.

15. In a motor of the type described, a frame housing, a plurality of spring drums supported therein, a shaft rotatably mounted in each of said drums, and spring means in each of said drums connected at one end to its drum shaft and the other end to the interior of its drum, means to rotate each drum in one direction to wind its spring means, means to hold each drum against rotation in the opposite direction whereby energy developed in the spring means will cause a rotation of its shaft, means on each shaft externally of each of said drums providing a power take off for energy produced by said spring means, and means connecting said shafts to an ultimate power take off member, whereby the sum of the power developed by the several units may be utilized.

16. In a motor of the type described, a plurality of frame housings, spring drums supported respectively in each of said housings, a shaft rotatably mounted in each of said drums and spring means in each of said drums connected at one end to its respective drum shaft, and at the other end to the interior of said drum, means to rotate the drum of one of said frame housings, in one direction to wind said spring means, means to hold said drum against rotation in the opposite direction, and means on said shaft externally of said drum providing a power take off for energy produced by said spring means, and means connecting said power take off means to the drum of another of said frame housings whereby said produced energy will be effective to rotate said last mentioned drum and wind the spring means therein.

17. In a motor of the type described, a plurality of frame housings, a plurality of spring drums in each of said housings, a shaft rotatably mounted in each of said drums, and spring means in each of said drums connected at one end to its respective drum shaft and at the other end to the interior of said drums, means to rotate the several drums of one of said frame housings, in one direction to wind the spring means therein, means to hold said drums against rotation in the opposite direction, and means on each drum shaft externally of said drums providing a power take-off for energy produced by said spring means of each drum, and means connecting said shafts to an ultimate power take off member whereby the sum of the power developed by the several units may be utilized, and means connecting said ultimate power take off means to the drums of another of said frame housings, whereby said produced energy will be effective to rotate said last mentioned drums and wind the spring means therein.

18. In a motor of the type described, a plurality of frame housings, a plurality of spring drums in each of said housings, a shaft rotatably mounted in each of said drums, and spring means in each of said drums connected at one end to its respective drum shaft and at the other end to the interior of said drums, means to rotate the several drums of one of said frame housings, in one direction to wind the spring means therein, means to hold said drums against rotation in the opposite direction, and means on each drum shaft externally of said drums providing a power take off for energy produced by said spring means of each drum, means connecting said shafts to an ultimate power take off member whereby the sum of the power developed by the several units may be utilized, and means to connect said ultimate power take off means to the drums of another of said frame housings one at a time, whereby said produced energy will be effective to rotate said last mentioned drums and wind the spring means therein.

19. In a motor of the type described, a plurality of frame housings, spring drums rotatably supported respectively in each of said housings, a shaft mounted in each of said drums for relative rotation therein, and spring means in said drum arranged to rotate its shaft relative to the drum, means on said shaft externally of said drum providing a power take off for energy produced by said spring means, and means connecting said power take off means to the drum of another of said frame housings, whereby said produced energy will be effective to rotate said last mentioned drums.

20. In a motor of the type described, a plurality of frame housings, a plurality of spring drums rotatably supported respectively in each of said housings, a shaft mounted in each of said drums for relative rotation therein, spring means in said drum arranged to rotate its respective shaft relative to the drum, and means on each drum shaft externally of said drum providing a power take off for energy produced by said spring means of each drum, means connecting said shafts to an ultimate power take off member whereby the sum of the power developed by the several units may be utilized, and means connecting said ultimate power take off means to the drums on another of said frame housings whereby said produced energy will be effective to rotate said last mentioned drums.

21. In a motor of the type described, the combination of a plurality of frame housings, a plurality of spring drums rotatably mounted in each of said housings, a shaft mounted in each of said drums for relative rotation therewith, spring means connecting each shaft with its respective drum, means to wind the spring in the drum of one unit while the respective spring shaft is releasing energy stored in the spring and means connecting the shafts of one frame housing to the drums of an adjacent frame housing, whereby the energy of the springs and shafts of the first mentioned housing will be utilized to produce a winding moment on the drums of said adjacent housing, while the shafts in the drums of the latter housing are being rotated by their respective spring means.

22. In a motor of the type described, the combination of a plurality of units, each comprising a plurality of spring drums, means to wind the spring drums of one unit of the motor and means to transmit such energy as will be stored in said unit upon winding thereof, to adjacent units, thereby to affect the winding of the spring drums in subsequent units and means to take off the energy transmitted through the drums by successive windings thereof at the other end of the motor.

In testimony whereof I affix my signature.
GEORGE O. JOYNER.